United States Patent
Zhu et al.

(10) Patent No.: US 10,425,262 B2
(45) Date of Patent: *Sep. 24, 2019

(54) METHOD AND SYSTEM FOR ADAPTIVE GUARD INTERVAL (GI) COMBINING

(71) Applicant: MaxLinear, Inc., Carlsbad, CA (US)

(72) Inventors: Mingrui Zhu, Irvine, CA (US); Arun Kedambadi, San Diego, CA (US); Seung Chul Hong, San Diego, CA (US); Anand Anandakumar, San Diego, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/113,527

(22) Filed: Aug. 27, 2018

(65) Prior Publication Data

US 2019/0123946 A1 Apr. 25, 2019

Related U.S. Application Data

(63) Continuation of application No. 14/687,234, filed on Apr. 15, 2015, now Pat. No. 10,063,399, which is a (Continued)

(51) Int. Cl.
*H04L 27/26* (2006.01)
*H04L 25/02* (2006.01)

(52) U.S. Cl.
CPC ...... *H04L 27/2605* (2013.01); *H04L 25/0216* (2013.01); *H04L 25/0222* (2013.01);
(Continued)

(58) Field of Classification Search
CPC ............ H04L 27/2607; H04L 27/2613; H04L 5/0048; H04L 5/0007; H04L 27/2675;
(Continued)

(56) References Cited

U.S. PATENT DOCUMENTS

| 2008/0112518 A1* | 5/2008 | Wilhelmsson | H04L 27/2647 375/348 |
| 2008/0152033 A1* | 6/2008 | Gore | H04L 25/0202 375/260 |

(Continued)

*Primary Examiner* — Sung S Ahn
(74) *Attorney, Agent, or Firm* — McAndrews, Held & Malloy, Ltd.

(57) ABSTRACT

Methods and systems are provided for adaptive guard interval (GI) combining. A signal carrying a symbol that is preceded by a guard interval (GI) that includes a portion of the symbol may be received, and a portion of the GI that is free from inter-symbol interference (ISI) may be determined. Only a part of the ISI-free portion of the GI may be selected. The selected part of the ISI-free portion of the GI may be less than a whole of the ISI-free portion. The selection may be configured based on a parameter that is applied to a function used in extracting the symbol. The parameter may be a timing adjustment, relative to a start of the symbol, applied to the function when extracting the symbol. Only the part of the ISI-free portion of the GI may then be extracted and combined with a corresponding portion of the symbol.

20 Claims, 5 Drawing Sheets

Related U.S. Application Data continuation of application No. 13/351,071, filed on Jan. 16, 2012, now Pat. No. 9,042,463.

(60) Provisional application No. 61/433,933, filed on Jan. 18, 2011.

(52) U.S. Cl.
CPC ...... *H04L 25/0226* (2013.01); *H04L 27/2647* (2013.01); *H04L 27/2607* (2013.01); *H04L 27/2655* (2013.01)

(58) Field of Classification Search
CPC ............. H04L 27/2665; H04L 27/2678; H04L 27/2663
See application file for complete search history.

(56) References Cited

U.S. PATENT DOCUMENTS

| | | | |
|---|---|---|---|
| 2009/0239484 A1* | 9/2009 | Miyoshi | H04L 27/2607 455/91 |
| 2010/0310022 A1* | 12/2010 | Asjadi | H04L 27/2605 375/343 |

* cited by examiner

METHOD AND SYSTEM FOR ADAPTIVE GUARD INTERVAL (GI) COMBINING

CLAIM OF PRIORITY

This patent application is a continuation of U.S. patent application Ser. No. 14/687,234, filed on Apr. 15, 2015, which is a continuation of U.S. patent application Ser. No. 13/351,071, filed on Jan. 16, 2012, which in turn makes reference to, claims priority to and claims benefit from U.S. Provisional Patent Application Ser. No. 61/433,933, filed on Jan. 18, 2011. Each of the above identified applications is hereby incorporated herein by reference in its entirety.

CROSS-REFERENCE TO RELATED APPLICATIONS/INCORPORATION BY REFERENCE

[Not Applicable].

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to communications. More specifically, certain embodiments of the invention relate to a method and system for adaptive guard interval (GI) combining.

BACKGROUND OF THE INVENTION

Communication devices may be operable to communicate using wireless and/or wired connections, and be utilized to receive inputs, store and process data, and provide outputs for various applications running on or via these devices. Communication devices may comprise, for example, personal computers (PCs), laptops or notebook computers, servers, cellular and smart phones or other similar handheld mobile devices, wireless access points, or other like devices. A communication device may comprise dedicated internal or external components for enabling network access operations, to enable sending and/or receiving data, in the form of packets, via wired and/or wireless connections, configured and/or structured in accordance with supported interfaces and/or protocols. Communication via the wireless and/or wired connections comprises embedding data into radio frequency (RF) signals. In this regard, the communication devices may be operable to transmit and/or receive RF signals carrying exchanged data, with the RF signals being configured in accordance with corresponding wired and/or wireless protocols or standards. Configuring the RF signals during wireless and/or wired communications may comprise use of particular modulation schemes, in accordance with the corresponding communication protocol or standard.

In this regard, RF modulation comprises modifying and/or configuring one or more signal characteristics based on the data carried therein. For example, with analog communications (e.g., traditional radio or TV broadcast), RF modulation schemes may comprise amplitude modulation (AM) based schemes, frequency modulation (FM) based schemes, and/or phase modulation (PM) based schemes. With digital communication, RF modulation may also incorporate and/or be based on "keying"—where the carrier signals are modulated to take one of limited number (typically two, corresponding to logic '0' and '1') values at all times. In this regard, exemplary digital modulation schemes may comprise phase-shift keying (PSK) based schemes, frequency-shift keying (FSK) based schemes, amplitude-shift keying (PSK) based schemes, and quadrature amplitude modulation (QAM) based schemes.

Therefore, facilitating proper reception of the information, at the receiver side, requires knowledge of the utilized modulation scheme, such that the corresponding demodulation processing may be performed to enable extracting the carried data. In addition, the reception processing may also incorporate particular aspects to account for and address any unintended changes to the RF signals during the communication. For example, during wireless communications RF signals may be changed due to movement to one or more of the communication devices, to reflection off or travelling through physical objects in the path, and/or due to external interference and/or electronic noise in the receiver device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for adaptive guard interval (GI) combining, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for adaptive guard interval (GI) combining. In various embodiments of the invention, adaptive guard interval (GI) combining may be performed by a communication device during reception of RF signals, on a received signal that comprises one or more symbols preceded by corresponding guard interval(s) and the symbol. In this regard, during GI combining, the guard interval(s) or portion(s) thereof may be combined with corresponding portion(s) of received symbol(s), to enable reducing the noise level in a channel and to reduce both the noise level and inter-carrier interference (ICI) for channels having short or medium delay spread. The adaptive GI combining may comprise determining, based on an impulse response provided by the received signal and relating to a channel used in communication thereof for example, whether a delay spread is smaller than a predetermined threshold for channel delay. This threshold is a design parameter determined by the maximum delay spread to be accommodated by the adaptive GI combining. In the event that the delay spread is determined to be smaller than the predetermined threshold, a portion of the guard interval that is free from inter-symbol interference (ISI) may be extracted, and the extracted portion of the guard interval may be combined with the corresponding portion of the received symbol. The delay spread may be determined by filtering an instantaneous delay spread which is associated with the received signal. The filtering may be performed by means of a 1-tap infinite impulse response low-pass filter. In this regard, the low-pass filter includes a time constant which equals the inverse of a maximum Doppler frequency shift.

Figure 1:
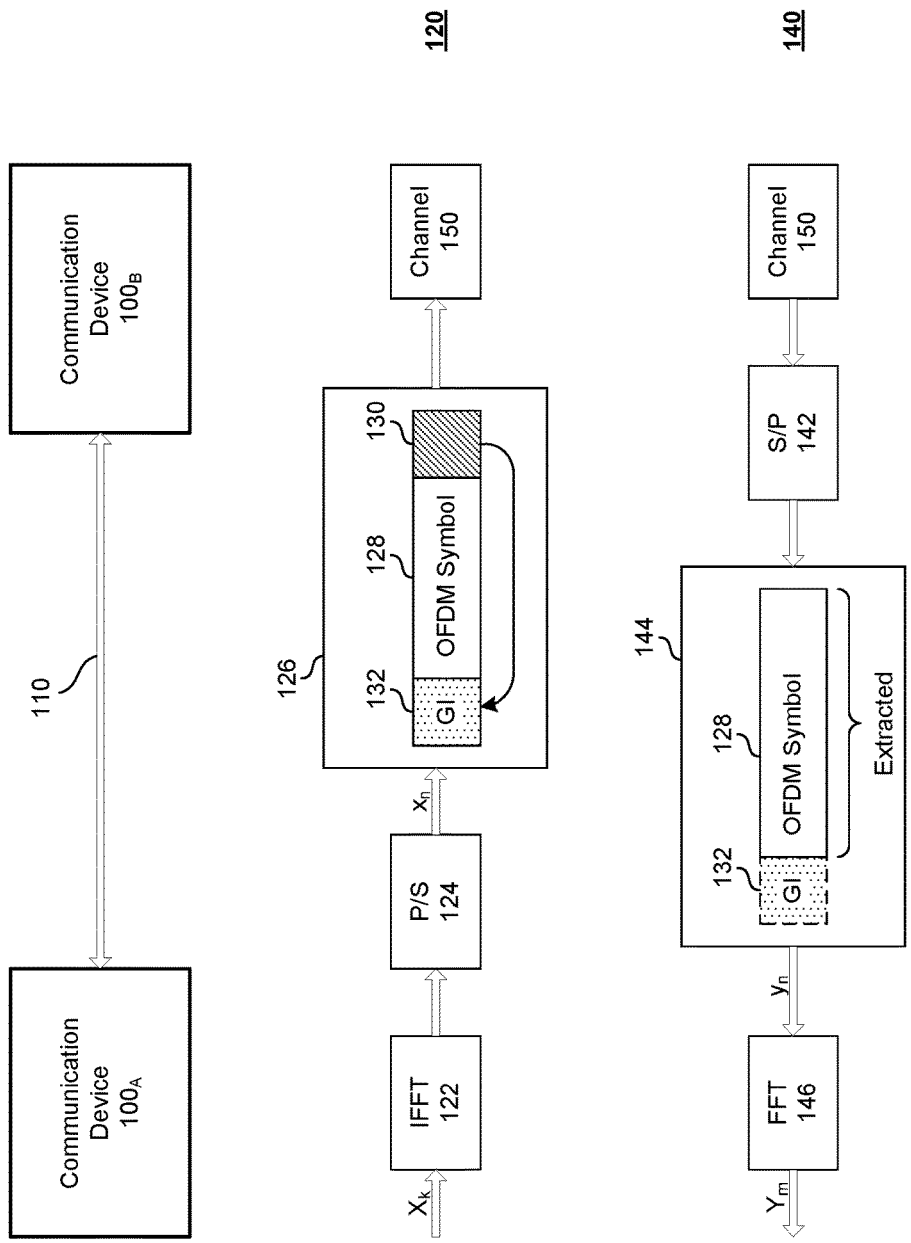
FIG. 1 is a block diagram illustrating an exemplary communication setup, which may be utilized in accordance with an embodiment of the invention.

FIG. 1 is a block diagram illustrating an exemplary communication setup, which may be utilized in accordance with an embodiment of the invention. Referring to FIG. 1, there are shown communication devices $100_A$ and $100_B$, which may communicate via connection 110.

Each of the communication devices $100_A$ and $100_B$ may comprise suitable logic, circuitry, interfaces, and/or code for enabling communication over wired and/or wireless connections. In this regard, the communication devices 100 may support a plurality of wired and/or wireless interfaces and/or protocols, and may be operable to perform necessary processing operations to facilitate transmission and/or reception of signals (e.g. RF signals) over supported wired and/or wireless interfaces. Exemplary communication devices may comprise cellular and smart phones or similar handheld devices, tablets, personal computers, laptops or notebook computers, servers, personal media players, personal digital assistants, set top boxes, wireless access points and/or cellular base stations, and/or other like devices. Exemplary wireless protocols or standards, which may be supported and/or used by the communication devices $100_A$ and $100_B$ for communication therebetween, may comprise wireless personal area network (WPAN) protocols, such as Bluetooth (IEEE 802.15) and ZigBee; wireless local area network (WLAN) protocols, such as WiFi (IEEE 802.11); cellular standards, such as GSM/GPRS/EDGE, UMTS, HSDPA, CDMA2000; 4G standards, such as WiMAX (IEEE 802.16) and LTE; Ultra-Wideband (UWB); Extremely High Frequency (EHF—e.g. 60 GHz); and/or Digital TV Standards, such as DVB-T/DVB-H, and ISDB-T. Exemplary wired protocols and/or interfaces may comprise Ethernet (IEEE 802.3), Digital Subscriber Line (DSL), Integrated Services Digital Network (ISDN), and/or Fiber Distributed Data Interface (FDDI); or wireless standards, such as WLAN (IEEE 802.11).

In operation, the communication devices $100_A$ and $100_B$ may communicate over the connection 110. In this regard, communication over the connection 110 may comprise transmission and reception of RF signals which are utilized to carry data exchanged between the communication devices $100_A$ and $100_B$. The RF signals communicated over the connection 110 may be configured in accordance with corresponding a wired and/or wireless protocol or standard. In this regard, configuring the RF signals may comprise use of particular modulation schemes, in accordance with the corresponding communication protocol or standard. One of the modulation schemes that has recently been widely deployed and used is Orthogonal Frequency-Division Multiplexing (OFDM), whereby digital data may be encoded on multiple sub-carrier frequencies, with each sub-carrier being modulated with a conventional modulation scheme, such as quadrature amplitude modulation (QAM) or phase-shift keying (PSK) at a low symbol rate, thus enabling maintaining total data rates similar to conventional single-carrier modulation schemes in the same bandwidth. The OFDM scheme provides an efficient use of radio spectrum by placing modulated subcarriers as close as possible without causing inter-carrier interference (ICI). Exemplary communication wired and wireless standards that incorporate use of OFDM comprise power line communication (PLC), Asymmetric digital subscriber line (ADSL), digital audio broadcast (DAB), digital video broadcast (DVB/ISDB-T), wireless LAN (IEEE 802.11a/g/n), and WiMAX (IEEE 802.16).

Accordingly, during communication between the communication devices $100_A$ and $100_B$, the transmitter device applies the proper modulation scheme (as dictated by the utilized communication standard) to transmitted RF signals during encoding of data carried thereby, and the receiver device applies the proper, corresponding demodulation processing, as dictated by the utilized modulation scheme, to enable extracting the carried data. Furthermore, the receiver device may apply additional functions and/or processing to ensure that the data carried by the RF signals is extracted correctly. In this regard, the additional processing may be tailored to account for the propagation of the RF signals, and to addressing potential issues related thereto. For example, during wireless communications between devices $100_A$ and $100_B$, RF signals and the reception thereof may be affected or altered by movement of one or both of the devices, by RF signals reflecting off or travelling through physical objects, and/or due to external interference and/or electronic noise in the receiver device. In this regard, during wireless communication the path between the transmitter and the receiver (e.g., devices $100_A$ and $100_B$) may vary from simple line-of-sight to one that is severely obstructed by buildings and mountains. Therefore, the received signal in a multipath environment may contain a series of attenuated, time-delayed, phase shifted replicas of the transmitted signal. In wired and/or wireless communications, the multipath environment is usually characterized by channel impulse response, where the difference between the time of arrival of the earliest significant multipath component and the time of arrival of the latest multipath component is commonly referred as delay spread or maximum delay spread. Furthermore, the moving speed of a mobile receiver, for example, may impact the signal fading level. In this regard, fading may be caused by interference between two or more versions of the transmitted signal which arrive at the receiver at different times due to multipath.

Due to the relative motion between the receiver and the transmitter (e.g., between a moving cellular phone and stationary base station), each multipath wave may experience a frequency shift. The frequency shift in received signal frequency due to motion is called the Doppler frequency shift and is directly proportional to the velocity and direction of motion of the device(s) with respect to the direction of arrival of the received multipath wave. The Doppler frequency shift can be calculated as:

$$fD = V * \frac{f}{c} * \cos(\phi) \tag{1}$$

where v is the receiver velocity; f is the carrier frequency of the transmitted signal; c is the speed of light; φ is the angle between the motion direction (e.g., of the receiver device) and the incoming signal direction; and fD is the Doppler frequency shift.

In an aspect of the invention, the reception of RF signals and extraction of data carried therein may be enhanced, and/or some of the issues arising from and/or relating to the propagation of the RF signals may be remedied and/or mitigated, by taking advantage of certain characteristics or attributes of the modulation scheme used by the communication devices. For example, in OFDM, since the received signal in a multipath channel may contain a series of attenuated, time-delayed, phase shifted replicas of the transmitted signal, the generation of the transmitted signals may comprise attaching guard intervals to transmitted symbols, wherein the guard interval may be correspond to a time period greater than the maximum delay spread of the channel to prevent inter-symbol interference (ISI) due to delay spread.

A simplified baseband model for OFDM transmission and reception is shown in FIG. 1. At the transmitter side 120, transmitting OFDM modulated RF signals may comprise converting modulated, data-bearing sub-carriers (in frequency domain) $X_k$ through Inverse-Fast-Fourier-Transform (IFFT) 122 to time-domain signal $x_n$, after a parallel-to-serial (P/S) conversion 124. A guard interval (GI) addition 126 is then performed whereby a guard interval (GI) 132 may be added to the beginning of each OFDM symbol 128 to handle the frequency selective fading—that is for preventing inter-symbol interference (ISI) due to delay spread. The guard interval (GI) 132 may be generated by replicating a particular portion (e.g. portion 130) of the OFDM symbol 128, which may comprise a last portion of the OFDM symbol 128—also commonly referred to as cyclic prefix (CP). The OFDM modulated RF signal is then communicated over the channel 150.

At the receiver side 140, the RF signal is received from the channel 150, and the sub-carriers are obtained via serial-to-parallel (S/P) conversion 142, and then a guard interval (GI) removal 142 is applied to remove the guard intervals 132. Then, a Fast-Fourier-Transform (FFT) 146 may be performed to convert the time-domain discrete samples $y_n$ into corresponding frequency-domain modulated sub-carriers $Y_m$, from which carried data is obtained (e.g., subsequent to demodulation).

The channel 150 may be modeled as having both frequency-selective fading and time-selective fading, where frequency-selectivity is characterized by delay spread and time-selectivity is characterized by Doppler frequency shift. Although OFDM is known to be robust against frequency-selective fading as the multi-carrier scheme can turn frequency-selective channel into a bank of frequency-flat channels, it is vulnerable to Doppler shift. In this regard, the received signal, at the receiver side 140, is convolution of transmitted signal and the channel 150. The implicit assumption of the FFT operation 146 performed at the receiver side 140 is that the channel 150 remains constant within the time interval of one OFDM symbol. The channel 150, however, may vary over time, even during the time interval of one OFDM symbol. The time-varying nature of the channel may be caused by, for example, the relative motion between the receiver and the transmitter devices, and/or by objects traversed or encountered along the signal path. Such time-variation may introduce inter-carrier-interference (ICI) that need to be mitigated in order to improve the reception performance.

In various embodiments of the invention, such time-variation related errors may be mitigated by taking advantage of the guard intervals, which are simply discarded in conventional systems. In other words, data carried in the guard intervals 132, which correspond to portions of the OFDM symbols 128, may be utilized to compensate for interference caused by time-variations in the channel.

For example, assuming the time-varying discrete channel, $h_n$, has only one tap to simplify the derivations, the received signal at time index n can be modeled as:

$$y_n = h_n \cdot x_n + \text{noise} = \frac{1}{N}\sum_{k=0}^{N-1} X_k \cdot e^{j2\pi \frac{kn}{N}} \cdot h_n + \text{noise} \tag{2}$$

where $X_k$ is modulated sub-carriers in frequency domain, $x_n$ is the transmitted time-domain signal, $y_n$ is the received time-domain samples after removing guard intervals, and noise represent the total external interference and/or electronic noise at the receiver side.

To recover the modulated data sub-carriers, $Y_m$, FFT operation 146 is performed on the received time-domain samples $y_n$ in accordance with the model:

$$Y_m = \sum_{n=0}^{N-1} y_n \cdot e^{-j2\pi \frac{mn}{N}} = \sum_{n=0}^{N-1} \frac{1}{N} \sum_{k=0}^{N-1} X_k \cdot e^{j2\pi \frac{kn}{N}} \cdot h_n \cdot e^{-j2\pi \frac{mn}{N}} + \text{noise} \tag{3}$$

which may be rewritten as:

$$Y_m = \sum_{k=0}^{N-1} X_k \frac{1}{N} \sum_{n=0}^{N-1} h_n \cdot e^{j2\pi \frac{(k-m)n}{N}} + \text{noise} \tag{4}$$

This can be simplified as:

$$Y_m = X_m \frac{1}{N} \sum_{n=0}^{N-1} h_n + \sum_{k=0, k\neq m}^{N-1} X_k \frac{1}{N} \sum_{n=0}^{N-1} h_n \cdot e^{j2\pi \frac{(k-m)n}{N}} + \text{noise} \tag{5}$$

It is straightforward to show that, if $h_n$ is constant over the OFDM symbol time, i.e., $h_n$=h for n=0 . . . N−1, the second term in the above equation will vanish, and $Y_m$=h·$X_m$+noise. However, as $h_n$ changes over time, the second term appears as interference to sub-carrier m from the rest of modulated sub-carriers.

It can be shown that the faster the channel (e.g. channel 150) changes, the larger the interference becomes and the more severe the performance is affected. Also, it can be seen that the power of the inter-carrier-interference (ICI) term is proportional to the signal power. Accordingly, under the worst high Doppler and high transmission power scenario, the ICI term may dominate the performance since signal-to-interference-and-noise ratio (SINR) will not benefit from increasing the transmit power since the ICI power increases correspondingly as the transmit power increases. Therefore, this effect must be properly mitigated to avoid error floors on the Bit-Error-Rate (BER) and Packet-Error-Rate (PER).

In OFDM based communications, the length of the guard interval (GI) may be determined, e.g. by design, to be long enough to guarantee that no inter-symbol-interference (ISI) is experienced. However, for channels characterized by predictable noise model, such as additive white Gaussian noise (AWGN), and having short delay spread, much of the guard interval is free of ISI and contains the same data and channel information as the last portion of the OFDM symbol. The quality of reception can be improved by using this redundant information. This may be more beneficial for short delay spread but high Doppler environment, where the channel state information bearing in the guard interval can reduce the overall time-variation and reduce the ICI.

Accordingly, in various embodiments of the invention, communication devices (e.g. devices $100_A$ and/or $100_B$) may adaptively combine, during reception of OFDM communication, a portion of the guard interval (GI) with a corresponding portion of the OFDM symbol, to reduce the noise level in the channel and/or inter-channel interference (ICI) where the GI duration is longer than the channel delay spread. In embodiment of the invention, the receiving communication device may automatically combine a portion or an entire GI with a corresponding portion of the OFDM symbol based on estimated channel impulse response, and may adaptively track the variation of the channel.

To maintain orthogonality, the receiving and transmitting devices need to remain perfectly synchronized. Accordingly, the receiving and transmitting devices may have to use exactly the same modulation frequency and the same time-scale for transmission. In some instances, one of the devices may be moving—e.g. the receiving device may be a moving cellular phone, whereas the transmitting device may be a stationary base station—and the relative motion between the receiving and transmitting devices may cause a Doppler shift in frequency and variation in the propagation delay, i.e., the difference of the time of transmission and the time of arrival of the earliest significant multipath component. Accordingly, in an embodiment of the invention, the receiving device may adjust the timing for the FFT operation performed thereby during reception operations to account for that relative movement and the resulting Doppler frequency shift. In this regard, the adjustment may be based on, for example, the delay spread between the receiving and transmitting devices. The channel impulse response may be time-varying when a mobile or a moving receiving device moves across a multipath environment. For example, the channel may slowly or abruptly change from short echo (short delay spread) to long echo (long delay spread), and back.

Figure 2:
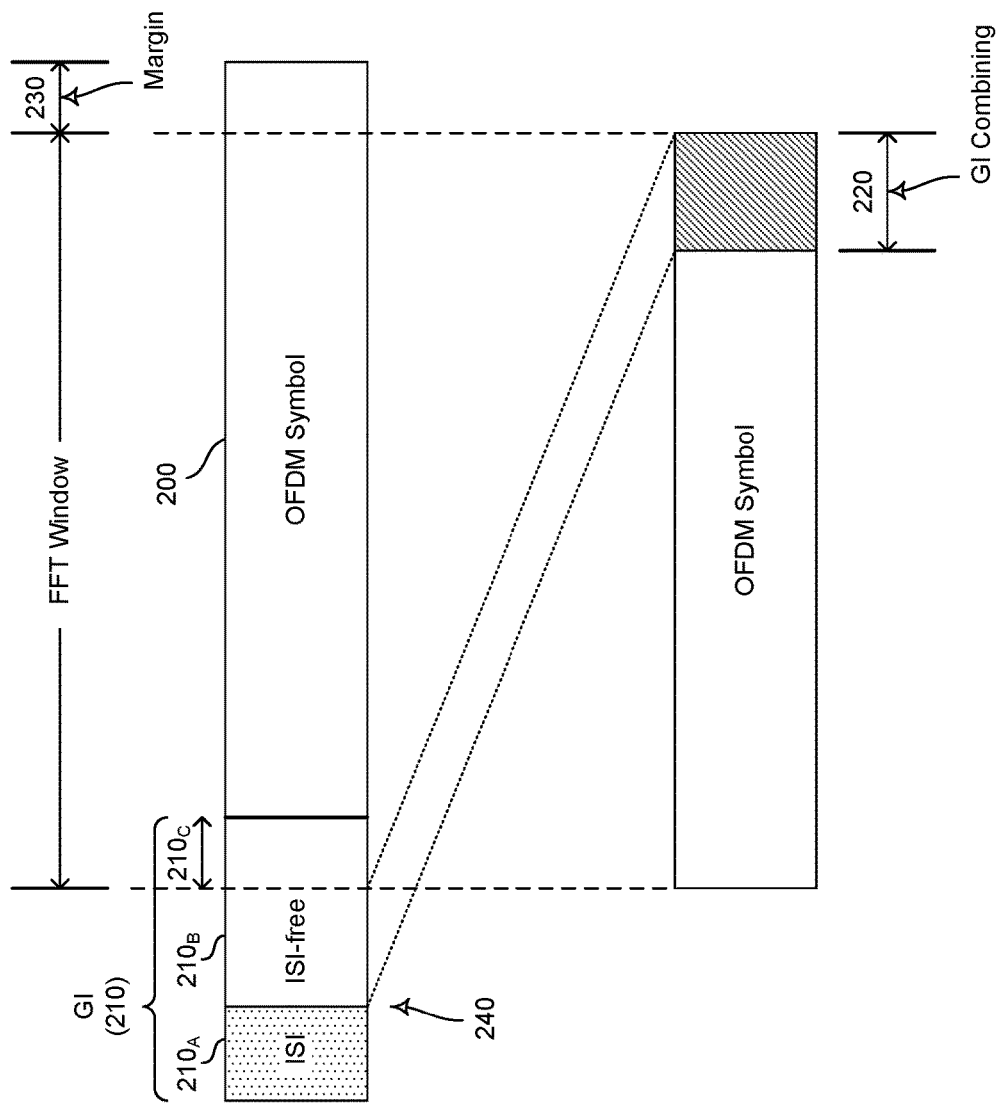
FIG. 2 is a block diagram illustrating an exemplary use of guard interval (GI) combining, in accordance with an embodiment of the invention.

FIG. 2 is a block diagram illustrating an exemplary use of guard interval (GI) combining, in accordance with an embodiment of the invention. Referring to FIG. 2, there is shown an OFDM symbol 200, preceded by a guard interval (GI) 210, which may be received and proceeded by the a receiving communication device, such communication device $100_A$ or $100_B$, during OFDM communication.

In operation, at least a portion of the GI 210 may be combined 220 with corresponding portion of the OFDM symbol 200, which may enable reducing channel noise and/or inter-channel interference (ICI). The GI 210 may comprise an inter-symbol interference (ISI) effected portion $210_A$ and an ISI-free portion $210_B$. The delineation 240 between the ISI-effected $210_A$ and the ISI-free portion 210 may correspond to, for example, the last detected channel multipath component. Accordingly, during GI combining 220, the ISI-effected portion $210_A$ of the GI 210 may be discarded, while the ISI-free portion $210_B$ may be extracted, and added to corresponding portion of the OFDM symbol 200. The sum may then be divided by 2 to insert back to the OFDM symbol. In an embodiment of the invention, the GI combining may be performed by performing the addition and then right-shifting the sum by 1 bit. GI combining may enable benefiting from the ISI-free portion $210_B$ of the GI 210, and may result in an OFDM symbol that may be more robust against Doppler Shift than a symbol obtained by completely and simply discarding the GI, as done in conventional systems.

In an embodiment of the invention, the receiving device may be configured to begin the FFT operation a few samples earlier than the real start of the OFDM symbol 200—i.e., the FFT window may be shifted relative to the start of the OFDM symbol 200 by a particular margin 230. Such configuration of the FFT operation may enable obtaining a more robust timing estimation. Accordingly, during GI combining 220 only part of the ISI-free portion $210_B$ of GI 210 may be extracted and added to the corresponding portion of the OFDM symbol, with the part $210_C$ of the ISI-free portion $210_B$ that correspond to the shifted start point of FFT operation being excluded from the GI combining operation. In other words, in such instances only the part of the GI 210 that is ISI free and precedes the start of the FFT window is used during GI combining.

The ISI-effected portion $210_A$ of the GI 210 may be determined by the receiving device during reception of the OFDM communication. This determination may be performed continuously and dynamically during reception of OFDM based signals. The determination of the ISI-effected portion $210_A$ may be based on estimated channel impulse response, with the remaining portion of the GI being considered ISI-free portion $210_B$, and thus being (potentially) subject to GI combining rather than being wasted as the case in the conventional systems. The delineation 240 of the ISI-effected $210_A$ may correspond to the detected last channel multipath component.

In an embodiment of the invention, the receiving device (e.g. device $100_B$ of FIG. 1) may not extract the GI 210 when the receiving device does not have accurate timing information of the start of the FFT window, as adding the GI 210 (or any portion thereof) to the OFDM symbol 200 in this stage may not improve the signal to noise ratio of the symbol.

In an embodiment of the invention, the receiving device may track changes in the delay spread associated with the reception channel after the start time of the FFT operation is determined. This may be necessary because the receiving device may not be able to accurately estimate the channel each time. For example, the receiving device may falsely detect a long echo where there is none, and thus may waste a good portion of the GI 200. Furthermore, the channel impulse response may slowly change over time as well. Therefore, in order to maximize the gain of the GI combining, the receiving device may instantaneously estimate the maximum delay spread. In other word, instead of estimating the maximum delay spread based on impulse response obtained from multiple OFDM symbols, the delay spread is estimated per OFDM symbol and filtered to obtain an average value. The filtering may be performed using a low-pass filter, which may enable averaging out impact of false maximum delay spreads.

Figure 3A:
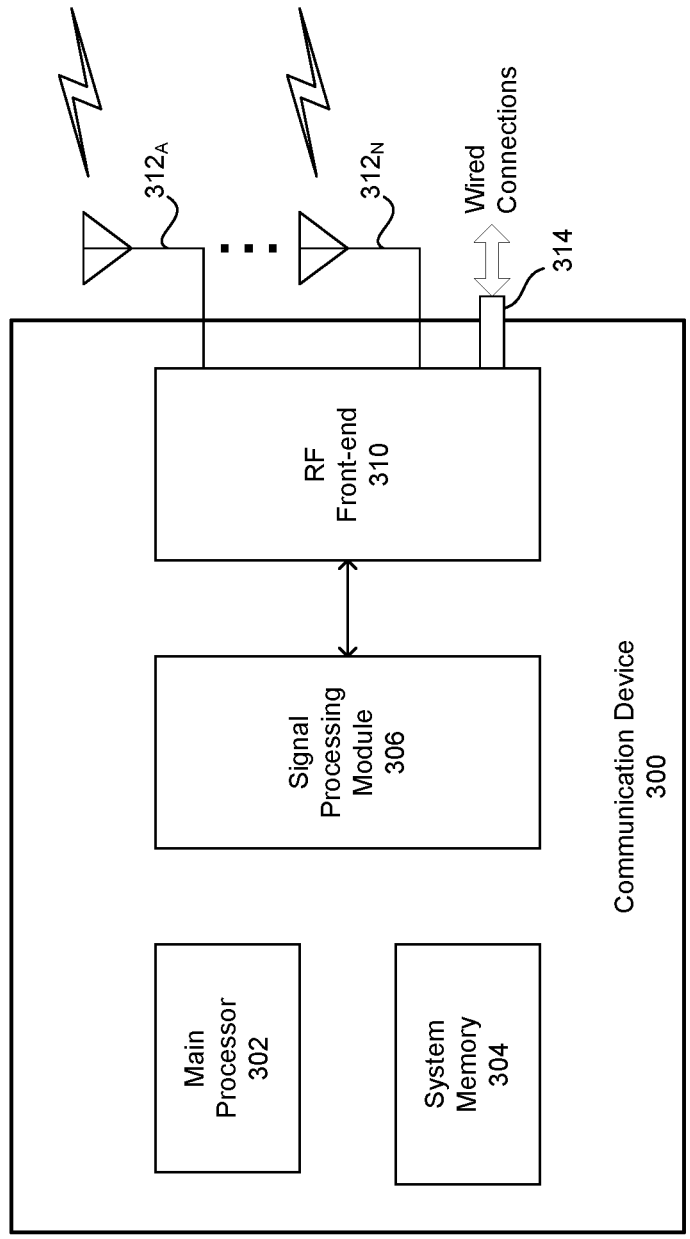
FIG. 3A is a block diagram illustrating an exemplary communication device that support guard interval (GI) combining, in accordance with an embodiment of the invention.

FIG. 3A is a block diagram illustrating an exemplary communication device that support guard interval (GI) combining, in accordance with an embodiment of the invention. Referring to FIG. 3A there is shown a communication device 300.

The communication device 300 may be similar to the communication devices 100A and/or 100B of FIG. 1, and may comprise suitable logic, circuitry, interfaces, and/or code that may be operable to implement various aspects of the invention. The communication device may comprise, for example, a host processor 302, a system memory 304, a signal processing module 306, a radio frequency (RF) front-end 310, a plurality of antennas 312$_A$-312$_N$, and one or more wired connectors 314.

The host processor 302 may comprise suitable logic, circuitry, interfaces, and/or code that may be operable to process data, and/or control and/or manage operations of the communication device 300, and/or tasks and/or applications performed therein. In this regard, the host processor 302 may be operable to configure and/or control operations of various components and/or subsystems of the communication device 300, by utilizing, for example, one or more control signals. The host processor 302 may enable execution of applications, programs and/or code, which may be stored in the system memory 304, for example.

The system memory 304 may comprise suitable logic, circuitry, interfaces, and/or code that may enable permanent and/or non-permanent storage, buffering, and/or fetching of data, code and/or other information, which may be used, consumed, and/or processed in the communication device 300. In this regard, the system memory 304 may comprise different memory technologies, including, for example, read-only memory (ROM), random access memory (RAM), Flash memory, solid-state drive (SSD), and/or field-programmable gate array (FPGA). The system memory 304 may store, for example, configuration data, which may comprise parameters and/or code, comprising software and/or firmware.

The signal processing module 306 may comprise suitable logic, circuitry, interfaces, and/or code for enabling processing of signals transmitted and/or received by the communication device 300. The signal processing module 306 may be operable to perform such signal processing operation as filtering, amplification, up-convert/down-convert baseband signals, analog-to-digital and/or digital-to-analog conversion, encoding/decoding, encryption/decryption, and/or modulation/demodulation.

The RF front-end 310 may comprise suitable logic, circuitry, interfaces, and/or code that may be operable to perform RF transmission and/or reception during wireless and/or wired communications, over a plurality of supported RF bands. The RF front-end subsystem 310 may enable, for example, performing wireless communications of RF signals via the plurality of antennas 312$_A$-312$_N$. Each of the plurality of antennas 312$_A$-312$_N$ may comprise suitable logic, circuitry, interfaces, and/or code that may enable transmission and/or reception of RF signals within certain bandwidths and/or based on certain protocols. For example, one or more of the plurality of antennas 312$_A$-312$_N$ may enable RF transmission and/or reception via the 2.4 GHz, which is suitable for WiMAX, Bluetooth and/or WiFi RF transmissions and/or receptions. The RF front-end subsystem 310 may enable performing wired communications of RF signals via the plurality of connectors 314. The wired connectors 314 may comprise suitable logic, circuitry, interfaces, and/or code that may enable transmission and/or reception of RF signals over wired connections, within certain bandwidths and/or based on certain protocols (e.g. Ethernet).

In operation, the communication device 300 may be operable performed wired and/or wireless communication, in accordance with one or more interfaces and/or protocols supported thereby. In this regard, the communication device 300 may be operable to perform transmission and/or reception of RF signals over supported wired and/or wireless interfaces, using the RF front-end 310, and to perform necessary signal processing operations to facilitate such transmission/reception, using the signal processing module 306. The RF signals transmitted and/or received by the communication device 300 may carry data pertaining to applications running in the communication device 300.

In some instances, the RF communication performed by the communication device 300 may incorporate use of the OFDM scheme. Accordingly, in various embodiments of the invention, the communication device 300 may configured to and/or operable to perform guard interval (GI) combining during RF signal reception. For example, OFDM based RF signals may be received by the RF front-end 310, wirelessly via one or more of the antennas 312$_A$-314$_N$ and/or over wired connections via one or more of the wired connectors 314. The received OFDM RF signals may then be subjected to GI combining, substantially as described with regard to FIGS. 1 and 2, such as during signal processing via the signal processing module 306.

Figure 3B:
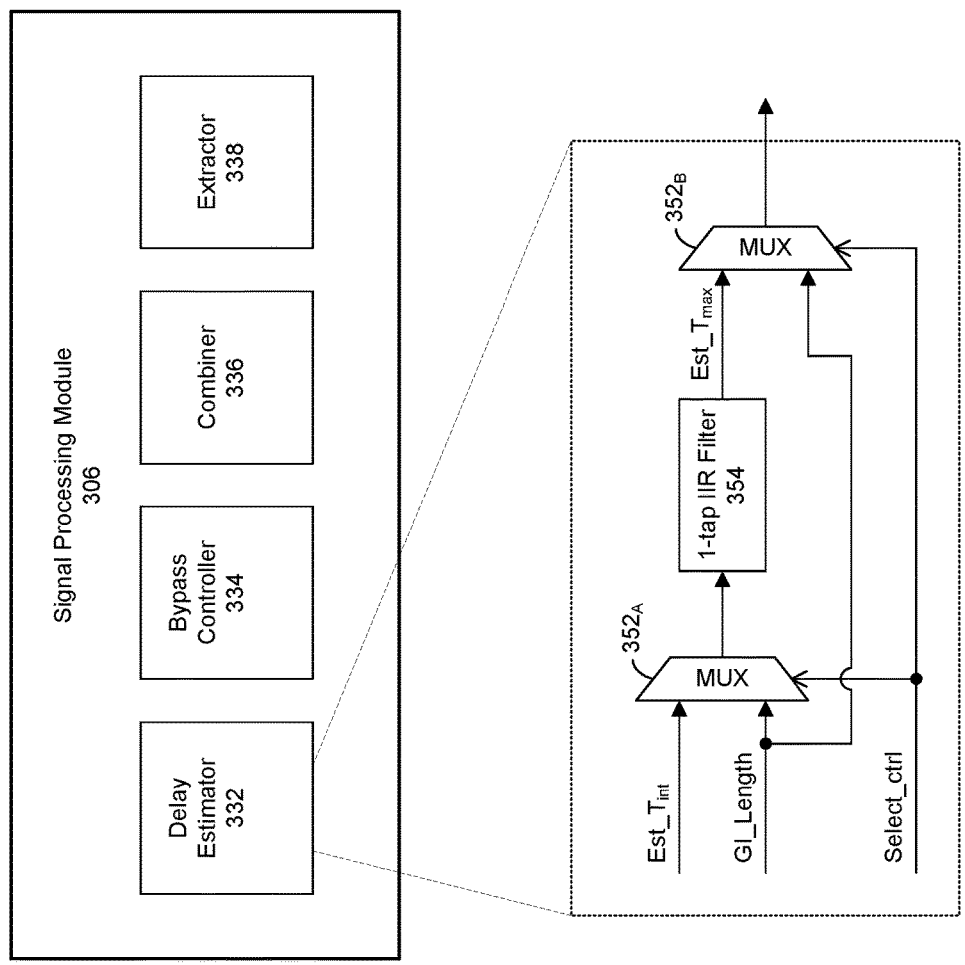
FIG. 3B is a block diagram illustrating an exemplary signal processing module that support guard interval (GI) combining, in accordance with an embodiment of the invention.

FIG. 3B is a block diagram illustrating an exemplary signal processing module that support guard interval (GI) combining, in accordance with an embodiment of the invention. Referring to FIG. 3B, there is shown the signal processing module 306 of FIG. 3A.

The signal processing module 306 may comprise a delay estimator 332, a bypass controller 334, a combiner 336, and an extractor 338.

The delay estimator 332 may comprise suitable logic, circuitry, interfaces, and/or code that may be operable to estimate channel delays during RF reception operations. The delay estimator 332 may be operable to determine, for example, whether a delay spread associated with a particular communication channel is smaller than a predetermined maximum channel delay. In this regard, the predetermined channel delay may correspond to, and/or be relevant to guard interval (GI) combining. In an embodiment of the invention, the delay estimator 332 may comprise a first multiplexer (MUX) 352$_A$, a second MUX 352$_B$, and a filter 354. Each of the first MUX 352$_A$ and the second MUX 352$_B$ may comprise suitable logic, circuitry, interfaces and/or code that may be operable to select an output from a plurality of inputs, based on one or more control signals. The filter 354 may comprise suitable logic, circuitry, interfaces and/or code that may be operable to perform filtering operations, in accordance with specific criteria and/or control parameters, on an input signal. The filter 354 may be implemented, for example, as a 1-tap infinite impulse response (IIR) filter.

The bypass controller 334 may comprise suitable logic, circuitry, interfaces, and/or code that enable bypassing GI combining in the signal processing module 306. In this regard, the bypass controller 334 may be operable to deactivate, disable, and/or bypass the combiner 336, to ensure extracting only OFDM symbols. The deactivation of the GI combining may be done in certain conditions, such as when the communication device 300 is in acquisition mode and/or when the determined delay spread of a channel is found to larger than a predetermined maximum delay spread.

The combiner 336 may comprise suitable logic, circuitry, interfaces, and/or code that may be operable to combined extracted portions of the guard intervals with corresponding portions of the OFDM symbols. In this regard, the combiner 336 may also incorporate additional function to account for the combining being performed therein, such as by dividing the sum by 2 for example. In an embodiment of the invention, the combiner 336 may comprise a binary adder and a 1-bit shifter.

The extractor 338 may comprise suitable logic, circuitry, interfaces, and/or code that may be operable to adaptively extract portions of the guard intervals. For example, the extractor 338 may be operable to extract ISI-free portions $210_B$, or part thereof (e.g., part of the ISI-free portion $210_B$ preceding start of shifted FFT windows), substantially as described with respect to FIG. 2.

In operation, the signal processing module 306 may be configured and/or operable to perform guard interval (GI) combining during signal processing of received RF signals. In this regard, the extractor 338 may be configured and/or operable to extract guard interval (GI) or portions thereof, during GI combining operations. The extractor 338 may be operable to, for example, locate the ISI-free portion $210_B$ of the GI 210, and copy that portion for subsequent use in GI combining. In instances where the FFT operation applied by the signal processing module 306 incorporate a window shift, the extractor 338 may determine the boundaries of the portion of the guard intervals that is both free of ISI effects and precedes the start of the FFT window. Combining the GI (or portions thereof) with the OFDM symbol may be performed via the combiner 336. In this regard, the GI combining may be comprise locating the portion of OFDM symbol that corresponds to the extracted GI (portion), then adding the OFDM symbol portion and the GI (portion), and then dividing the sum by 2 (i.e. averaging).

In an embodiment of the invention, the delay estimator may be configured and/or operable to perform instantaneous estimate of the maximum delay spread. For example, the first MUX $352_A$ may select between two inputs, GI_length, which corresponds to the total length of the guard interval, and Est_$T_{int}$, which corresponds to an instantaneous estimate of the maximum delay spread, as measured for a particular OFDM symbol. The filter 354 is then used to filter the output of the first MUX $352_A$. In this regard, use of the filter 354 may enable averaging the per-symbol values obtained from the first MUX $352_A$ over a plurality of symbols, shown as an average estimate of the maximum delay spread: Est_$T_{max}$. The output of the filter 354, Est_$T_{max}$, is coupled as an input to the second MUX $352_B$, with the first input of the second MUX $352_B$ being the GI_length input (same as first MUX $352_A$). Thus, based on the selection performed by the first MUX $352_A$, the input of the low-pass filter may be set to either Est_$T_{int}$ (the instantaneous estimate of the maximum delay spread) or GI_length (the total length of the guard interval), while the second MUX $352a$ may enable selecting, as an output, between GI_length and the output of the filter 354.

The filter 354 may comprise a low-pass filter, and may be implemented as a 1-tap infinite impulse response (IIR) filter having a filter coefficient α. In this regard, the time constant α of the low-pass filter 354 may be set (equal) to the inverse of the maximum Doppler shift. For example, the output of the filter 354, Est_$T_{max}$ may be set to: $T_{max}*(1-\alpha)+T_{int}*\alpha$, where $T_{max}$ is the maintained maximum measured delay value, and $T_{int}$ is the measured instantaneous delay value.

Both of first MUX $352_A$ and second MUX $352_B$ are controlled using the same selection control signal: select_ctrl. The select_ctrl signal may essentially enable selecting between performing instantaneous estimation of channel delay spread (and thus performing GI combining) and bypassing GI combining. In this regard, when the receiving device (i.e. communication device 300 during reception of signal) may be moving while receiving, the delay between the receiving and transmitting devices may vary, thus possibly causing the instantaneous estimate of the maximum delay spread to become inaccurate. Therefore, to avoid inter-symbol interface (ISI) during such transition period, the length of GI is used to replace the estimate of the instantaneous delay spread, by asserting/de-asserting the signal select_ctrl, and thus the receiving device would use the full length of GI (discard all of it), and the GI combining function is thus not used for the current symbol.

Figure 4:
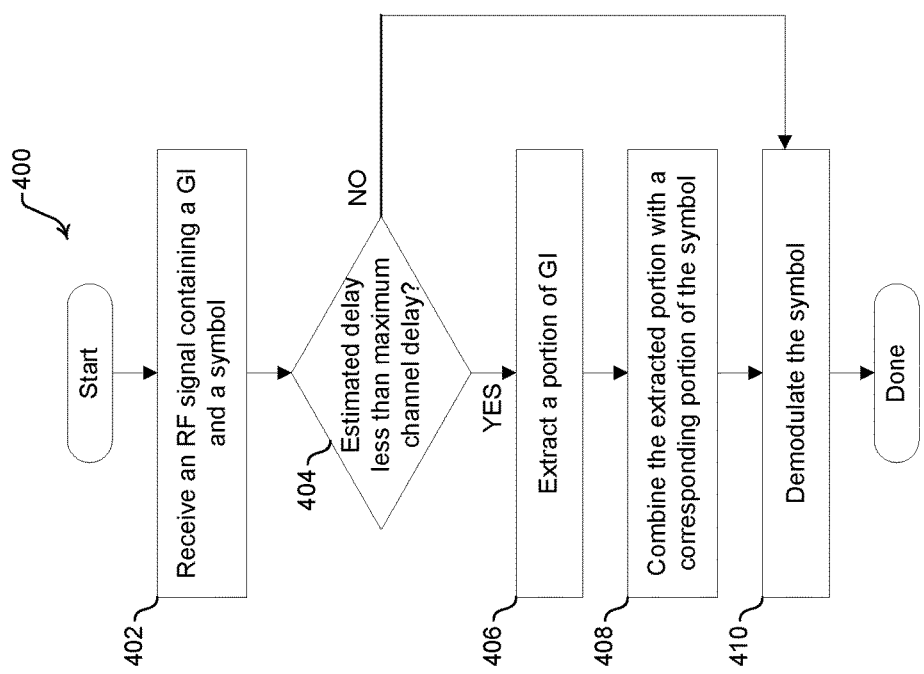
FIG. 4 is a flow chart that illustrates exemplary steps for adaptive guard interval (GI) combining, in accordance with an embodiment of the invention.

FIG. 4 is a flow chart that illustrates exemplary steps for adaptive guard interval (GI) combining, in accordance with an embodiment of the invention. Referring to FIG. 4, there is shown a flow chart 400 comprising a plurality of exemplary steps that may be performed by a communication device (e.g. device 300 of FIGS. 3A and 3B) to enable performing adaptive guard interval (GI) combining during communications.

At step 402, a communication device (e.g. device 300) may receive a radio frequency (RF) signal containing one or more symbols preceded by corresponding guard interval(s). In this regard, the RF signal may be modulated in accordance with OFDM scheme; with the symbol containing OFDM modulated data and the guard interval (GI) containing a copy of a portion of the OFDM modulated data. In such OFDM schemed, the guard interval (GI) may comprise a cyclic prefix generated by copying a portion of the OFDM symbol taken at the rear of the OFDM symbol and placing it (the copy) at the beginning of the symbol, to act as a time buffer for the transmission of the next symbol so that the current symbol does not interfere with the next symbol, due to the effect of channel delay for example. In conventional systems, such guard intervals are considered as overhead, and are simply discarded at the receiver side, and the received RF signal is then frequency down-converted, A/D converted and provided to a baseband processor that then performs timing detection and delay time estimation. In accordance with the invention, however, guard interval (GI) may be performed during reception of RF signals.

In this regard, at step 404, the delay time associated with the channel may be compared with a maximum channel delay. In instances where it may be determined that the estimated delay time is not smaller than the maximum channel delay, the process may skip to step 410. In instances where it may be determined that the estimated delay time is smaller than the maximum channel delay, however, the process may proceed to step 406, where the guard interval (GI) or a portion thereof may be extracted. In this regard, the extracted portion may comprise the part of the guard interval (GI) that is not affected by the inter-symbol interference, corresponding to the difference between the total length of the guard interval (GI) and an initial portion of the guard interval (GI) that is within the estimated delay time. The estimated delay time may be estimated per each received symbol. In this regard, the estimated delay may be further filtered via a low-pass filter to prevent any false estimation due to burst noise or the likes. The low-pass filter may be implemented using a 1-tap IIR filter having a time constant that is equal to the inverse of the maximum Doppler frequency.

At step 408, the receiving device may combine the extracted portion of the guard interval (GI) with a corresponding portion of the symbol. The combining may comprise a linear addition of the extracted portion and the corresponding portion of the symbol, with the sum then being divided by 2 and inserted back to the symbol. The division may be performed as a 1-bit right-shift. At step 450, the symbol that contains the combined portion is then demodulated.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for broadband analog to digital converter technology.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
    receiving a signal carrying at least one symbol that is preceded by a guard interval (GI) that comprises a portion of the symbol;
    determining a portion of the guard interval (GI) that is free from inter-symbol interference (ISI);
    selecting only a part of the ISI-free portion of the guard interval (GI), wherein:
        the part of the ISI-free portion of the guard interval (GI) is less than a whole of the ISI-free portion; and
        the selection is configured based on a parameter that is applied to a function used in extracting the symbol;
    extracting only the part of the ISI-free portion of the guard interval (GI); and
    combining the extracted part of the ISI-free portion of the guard interval (GI) with a corresponding portion of the symbol.

2. The method of claim 1, wherein the received signal comprises an orthogonal frequency division multiplexed (OFDM) signal.

3. The method of claim 1, wherein the guard interval (GI) is generated based on cyclic prefixing.

4. The method of claim 1, wherein the combining comprises a linear addition and a shifting operation.

5. The method of claim 1, wherein the parameter comprises a timing adjustment, relative to a start of the symbol, applied to the function when used in extracting the symbol.

6. The method of claim 1, comprising configuring one or more of the selecting, the extracting and the combining of the part of the ISI-free portion of the guard interval (GI) being based on a measurement associated with a communication channel used in receiving the received signal.

7. The method of claim 6, wherein the measurement comprises obtaining at least one measured value associated with the communication channel, and further comprising performing the configuring based on comparing of the measured value with a corresponding preset value.

8. The method of claim 1, comprising adaptively selecting the corresponding portion of the symbol within the symbol, based on one or more criterion.

9. The method of claim 8, comprising selecting the corresponding portion of the symbol based on the selecting of the part of the ISI-free portion of the guard interval (GI).

10. The method of claim 9, comprising selecting the corresponding portion of the symbol to have a same size as the part of the ISI-free portion of the guard interval (GI).

11. A system comprising:
    one or more signal receiving circuits configured for receiving a signal; and
    one or more signal processing circuits configured to, when the signal carries at least one symbol that is preceded by a guard interval (GI) that comprises a portion of the symbol:
        determine a portion of the guard interval (GI) that is free from inter-symbol interference (ISI);
        select only a part of the ISI-free portion of the guard interval (GI), wherein:
            the part of the ISI-free portion of the guard interval (GI) is less than a whole of the ISI-free portion; and
            the selection is configured based on a parameter that is applied to a function used in extracting the symbol;
        extract only the part of the ISI-free portion of the guard interval (GI); and
        combine the extracted part of the ISI-free portion of the guard interval (GI) with a corresponding portion of the symbol.

12. The system of claim 11, wherein the parameter comprises a timing adjustment, relative to a start of the symbol, applied to the function when used in extracting the symbol.

13. The system of claim 11, wherein the received signal comprises an orthogonal frequency division multiplexed (OFDM) signal.

14. The system of claim 11, wherein the guard interval (GI) is generated based on cyclic prefixing.

15. The system of claim 11, wherein the one or more signal processing circuits are configured to, when combining the extracted part of the ISI-free portion of the guard interval (GI) with the corresponding portion of the symbol, apply a linear addition and a shifting operation.

16. The system of claim 11, wherein the one or more signal processing circuits are configured to perform one or more of the selecting, the extracting and the combining of the part of the ISI-free portion of the guard interval (GI) based on a measurement associated with a communication channel used in receiving the received signal.

17. The system of claim 16, wherein the one or more signal processing circuits are configured to, when performing the measurement, obtain at least one measured value associated with the communication channel, and compare the measured value with a corresponding preset value.

18. The system of claim 11, wherein the one or more signal processing circuits are configured to adaptively select the corresponding portion of the symbol within the symbol, based on one or more criterion.

19. The system of claim 18, wherein the one or more signal processing circuits are configured to select the corresponding portion of the symbol based on the selecting of the part of the ISI-free portion of the guard interval (GI).

20. The system of claim 19, wherein the one or more signal processing circuits are configured to select the corresponding portion of the symbol to have a same size as the part of the ISI-free portion of the guard interval (GI).

* * * * *